(12) United States Patent
Senneff et al.

(10) Patent No.: US 10,655,697 B2
(45) Date of Patent: May 19, 2020

(54) VIBRATION ISOLATOR

(71) Applicant: ITT Manufacturing Enterprises LLC, Wilmington, DE (US)

(72) Inventors: James Senneff, Buffalo, NY (US); Marshall Downing, Erie, PA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 115 days.

(21) Appl. No.: 15/817,796

(22) Filed: Nov. 20, 2017

(65) Prior Publication Data

US 2018/0142752 A1    May 24, 2018

Related U.S. Application Data

(60) Provisional application No. 62/425,734, filed on Nov. 23, 2016.

(51) Int. Cl.
*F16F 1/38* (2006.01)
*F16C 17/00* (2006.01)

(52) U.S. Cl.
CPC .............. *F16F 1/38* (2013.01); *F16F 1/3842* (2013.01); *F16F 1/3863* (2013.01); *F16F 2226/04* (2013.01); *F16F 2236/123* (2013.01)

(58) Field of Classification Search
CPC .......... F16F 1/38; F16F 1/3807; F16F 1/3842; F16F 1/3863; F16C 17/035
See application file for complete search history.

(56) References Cited

U.S. PATENT DOCUMENTS

| 2,950,626 A | * | 8/1960 | Short | B23B 45/008 |
| | | | | 74/333 |
| 3,399,851 A | * | 9/1968 | Romolo | F16F 3/093 |
| | | | | 267/140.3 |
| 4,767,108 A | * | 8/1988 | Tanaka | B60G 7/00 |
| | | | | 267/140.12 |

(Continued)

FOREIGN PATENT DOCUMENTS

| DE | 923 046 | 2/1955 |
| DE | 10 2012 213 028 A1 | 1/2014 |

(Continued)

OTHER PUBLICATIONS

International Search Report and Written Opinion for PCT/US2017/062671; dated Apr. 11, 2018; 13 pages.

*Primary Examiner* — Thomas J Williams
*Assistant Examiner* — James K Hsiao
(74) *Attorney, Agent, or Firm* — Barclay Damon LLP

(57) ABSTRACT

A vibration isolator includes a housing having a top surface, an opposing bottom surface, and a hollow interior and an open-ended sleeve having a hollow interior and an extending flange, the extending flange having a top surface and a bottom surface. A resilient core, having a hollow interior, is positioned between and fixedly coupled to the bottom surface of the housing and the top surface of the flange of the sleeve. The resilient core is disposed within a portion of the hollow interior of the open-ended sleeve. A first bushing is disposed within the interior of the sleeve. The first bushing has a flange including a bottom surface that overlays a top surface of the resilient core. A second bushing is disposed within the first bushing.

20 Claims, 21 Drawing Sheets

(56) References Cited

U.S. PATENT DOCUMENTS

| | | | | |
|---|---|---|---|---|
| 4,809,960 A * | 3/1989 | Kakimoto | B60G 7/00 248/634 |
| 5,028,163 A * | 7/1991 | Krieg | B62D 7/16 403/131 |
| 5,131,638 A * | 7/1992 | Hein | B60G 13/003 267/141.4 |
| 5,286,014 A * | 2/1994 | Chakko | B60G 7/00 267/141.2 |
| 5,743,509 A | 4/1998 | Kanda et al. | |
| 7,163,200 B2 * | 1/2007 | Dickson | F16F 1/3735 248/635 |
| 7,261,365 B2 * | 8/2007 | Dickson | B60G 99/002 248/635 |
| 7,407,234 B1 * | 8/2008 | McCormick | B60T 8/3685 303/119.3 |
| 7,918,438 B2 * | 4/2011 | Sato | F16F 1/38 248/634 |
| 8,511,656 B2 * | 8/2013 | Yahata | F16F 1/3863 248/635 |
| 8,534,658 B2 * | 9/2013 | Schron, Sr. | F16B 21/165 269/289 R |
| 8,763,628 B2 * | 7/2014 | Buttafuoco | F16F 1/3732 137/351 |
| 8,939,437 B2 * | 1/2015 | Kobori | F16F 1/3735 267/140.3 |
| 9,605,728 B2 * | 3/2017 | McMullen | F16F 1/3735 |
| 9,739,338 B2 * | 8/2017 | Hattori | B62D 33/0604 |
| 10,119,587 B2 * | 11/2018 | Watanabe | B64G 1/22 |
| 2008/0079205 A1 * | 4/2008 | Hayashi | F16F 1/3828 267/140.13 |
| 2012/0098178 A1 * | 4/2012 | Yahata | F16F 1/3842 267/141.2 |
| 2014/0210148 A1 * | 7/2014 | Eguchi | F16F 1/3828 267/141 |
| 2014/0239659 A1 * | 8/2014 | Rodecker | B62D 24/02 296/35.1 |
| 2015/0377312 A1 * | 12/2015 | Russell | F16F 1/38 384/125 |
| 2016/0221407 A1 * | 8/2016 | Molesworth | B60G 11/12 |
| 2017/0166025 A1 * | 6/2017 | Auten | B60G 11/12 |

FOREIGN PATENT DOCUMENTS

| | | |
|---|---|---|
| EP | 2 644 930 A2 | 10/2013 |
| EP | 2 644 930 A3 | 10/2013 |
| WO | WO 2013/075788 A1 | 5/2013 |
| WO | WO 2014/038995 A1 | 3/2014 |

* cited by examiner

VIBRATION ISOLATOR

CROSS REFERENCE TO RELATED APPLICATION

This application claims priority upon U.S. Patent Application Ser. No. 62/425,734, filed Nov. 23, 2016, under relevant portions of 35 U.S.C. § 119 and 37 CFR § 1.53. The entire contents of this document is hereby incorporated by reference.

TECHNICAL FIELD

This application generally relates to the field of vibratory isolation and damping assemblies and more specifically to a vibration isolator that isolates a cabinet or other fixture or structure from vibrational loads.

BACKGROUND

Vibration isolators and damping assemblies are commonly used in a number of disparate fields in order to isolate various structures from vibration loads. For example, high-end business aircraft typically have seats, tables, credenzas, stereo and TV cabinets, glassware, etc., collectively known as "monuments", installed therein. These monuments are coupled, such as through a fixed bolted connection, to a seat track or other structural rail formed in the floor of the aircraft. In use, a plurality of vibration isolators are positioned between the monuments and the structural rail to which the monuments are coupled for isolation purposes.

Known vibration isolators used for the above stated purposes may include a damping feature, such as an elastomeric grommet, within the body of the vibration isolator. However, such grommets are typically disposed somewhat loosely within the body of the vibration isolator. As a result, these components are subject to being accidentally lost during installation of the vibration isolator. In addition and due to the loose fitting nature of the elastomeric grommets within the body of the vibration isolator, these grommets themselves independently vibrate, thereby increasing the natural frequency of the vibration isolator. Furthermore, these elastomeric grommets typically have a short lifespan, as compared to the remainder of the isolator assembly, due to friction between the components under loads experienced during operation, requiring excessive and undesired maintenance as well as related costs.

BRIEF DESCRIPTION

Various embodiments of a vibration isolator are described herein. Advantageously and according to at least one version, the vibration isolator has good high frequency performance. In addition and according to at least one version, due to the bonded nature of a resilient core to surfaces within the confines of the vibration isolator, the natural frequency of the vibration isolator is effectively decreased, as compared to known vibration isolators, such as those described above. In addition, the resilient core has an extended life and is less prone to replacement and repair.

According to a first aspect, a vibration isolator is described. The vibration isolator includes a housing having a top surface, an opposing bottom surface and a hollow interior. In addition, the vibration isolator includes an open-ended sleeve having a hollow interior and an extending flange, the extending flange having a top surface and a bottom surface. A resilient core, having a hollow interior, is positioned between and fixedly coupled to the bottom surface of the housing and the top surface of the flange of the sleeve. The resilient core is disposed within a portion of the hollow interior of the open-ended sleeve. A first bushing is disposed within the interior of the sleeve. The first bushing has a flange including a bottom surface that overlays a top surface of the resilient core. A second bushing is disposed within the first bushing.

In an embodiment, the bottom surface of the housing includes an inwardly extending extension defined by an upper tapered wall and a lower tapered wall and the open-ended sleeve is defined by an upper cylindrical portion, a lower flanged portion, and a transitional portion between the upper cylindrical portion and the lower flanged portion. The transitional portion is angled to mirror the lower tapered wall of the housing. The resilient core is coupled to the inwardly extending extension of the housing and to the upper cylindrical portion, lower flanged portion, and transitional portion of the open-ended sleeve. The upper surface of the resilient core corresponds to a shape of an outer surface of the first bushing. The upper surface of the resilient core corresponds to a shape of an outer surface of the first bushing. In another embodiment, the bottom surface of the housing includes an inwardly extending extension extending substantially perpendicularly to an outer surface of the housing and wherein the open-ended sleeve is defined by a lower flanged portion extending substantially perpendicularly to an upper cylindrical portion. The resilient core is coupled to the inwardly extending extension of the housing and to the upper cylindrical portion and lower flanged portion of the open-ended sleeve. The resilient core conforms to a portion of an inner surface of the housing to form an upper surface.

In an embodiment, the second bushing and the first bushing each include eccentrically disposed through openings. The through opening of the first bushing has a shape corresponding to an exterior shape of the second bushing. In an embodiment, an inner surface of the through opening of the first bushing includes a first circumferential groove, the first circumferential groove being configured to align with a second circumferential groove of the second bushing. The first groove and the second groove combine to form a first retention track formed between the first and second bushings. A first retention member can be positioned within the first retention track. The first retention member is configured to retain the second bushing relative to the first bushing. In an embodiment, the open-ended sleeve further includes a third circumferential groove extending around an inner surface of the sleeve that is configured to align with a fourth circumferential groove encircling an outer surface of the first bushing to form a second retention track. A second retention member can be positioned within the second retention track to retain the first bushing relative to the open-ended sleeve. The through aperture of the second bushing can be configured to receive a fastener.

In an embodiment, a mounting sleeve has an interior configured to receive the vibration isolator. The interior of the mounting sleeve includes an inner threaded surface and the housing of the vibration isolator includes an outer threaded surface configured for engagement. The mounting sleeve can include a flange having a slot extending through a portion of the flange perpendicular to a longitudinal axis of the mounting sleeve. The flange has a mounting hole parallel to the longitudinal axis and seized to receive a fastener to engage the slot in order to selectively adjust the height of the vibration isolator within the mounting sleeve. The vibration isolator can have a natural frequency between 30 to 55 Hz.

According to another aspect, a vibration isolating monument mount is described. The mount includes a housing having a top surface and an opposing bottom surface. The mount additionally includes an open-ended sleeve having a hollow interior and an extending flange. The flange has a top surface and a bottom surface, the bottom surface of the flange flush with a bottom surface of the sleeve. A resilient core is positioned between and secured to the bottom surface of the housing and the top surface of the flange of the open-ended sleeve. The resilient core additionally conforms to a portion of an inner surface of the housing to form an upper surface. A first bushing is retained within the cylindrical sleeve such that the first bushing overlays a top surface of the resilient core. A second bushing is retained within the first bushing.

According to yet another aspect, a method of manufacturing a vibration isolator is described. The method includes providing a housing having a top surface and an opposing bottom surface. The method further includes providing an open-ended sleeve having a hollow interior and an extending flange, the flange having a top surface and a bottom surface, at least a portion of the sleeve being disposed within the housing. The method additionally includes providing a resilient core configured to be bonded to the bottom surface of the housing and the top surface of the flange of the sleeve. A first bushing configured to be disposed within the sleeve such that a the first bushing overlays a top surface of the resilient core is provided and a second bushing configured to be disposed within the first bushing is provided.

These and other features and advantages will become readily apparent to those skilled in the art with reference to the following Detailed Description, in conjunction with the accompanying drawings that are first briefly described.

BRIEF DESCRIPTION OF THE DRAWINGS

The accompanying drawings, which are incorporated herein and constitute part of this specification, illustrate presently various embodiments, and, together with the general description given above and the following Detailed Description, serve to explain salient features of the invention in which.

DETAILED DESCRIPTION

The following description should be read with reference to the accompanying drawings, in which like elements in different drawings are identically numbered for the sake of clarity. The drawings, which are not necessarily to scale, are intended to depict salient features of the design in selected embodiments and are not intended to limit intended scope. The following description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

In addition, various terms are used throughout in order to provide a suitable frame of reference with regard to the accompanying drawings such as "bottom", "upper", "top", "within", "lateral", "upon", "front", "back", "inner", "outer", and the like. Unless specified, the terms described above are not intended to narrow the scope of the invention as described herein and according to the claims, except where so specifically indicated.

Certain embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting and that the scope of the present disclosure is defined solely by the claims. For purposes of the following description, it should further be noted that the features illustrated or described in connection with one embodiment may be combined with the features of other embodiments. Such modifications and variations are intended to be included within the intended scope of the present disclosure. For purposes of the following embodiments, the devices and methods that are described herein are intended for use in vibration isolation of mounted objects, such as but not limited to furniture provided in high-end business aircraft.

Figure 1:
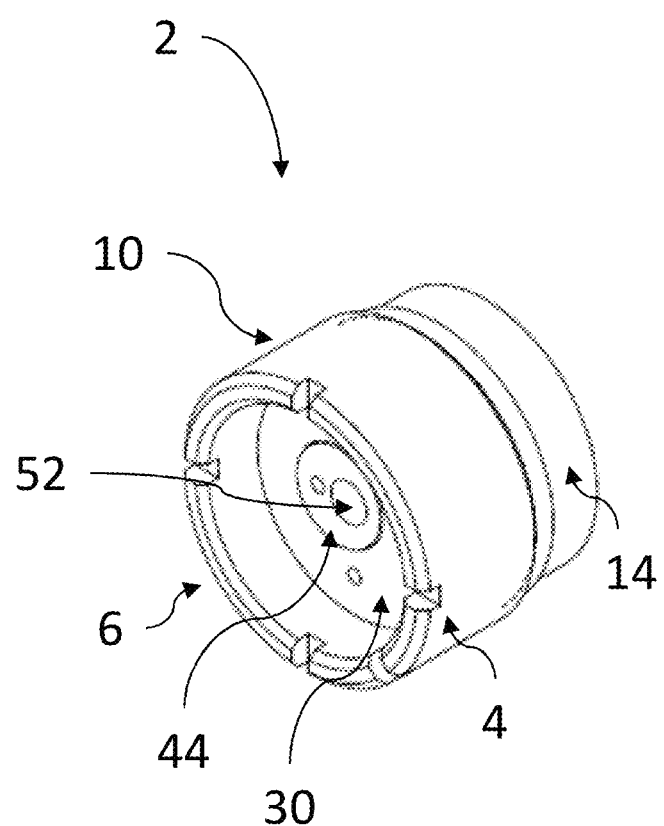
FIG. 1 illustrates a top perspective view of a vibration isolator in accordance with an embodiment.
Figure 2A:
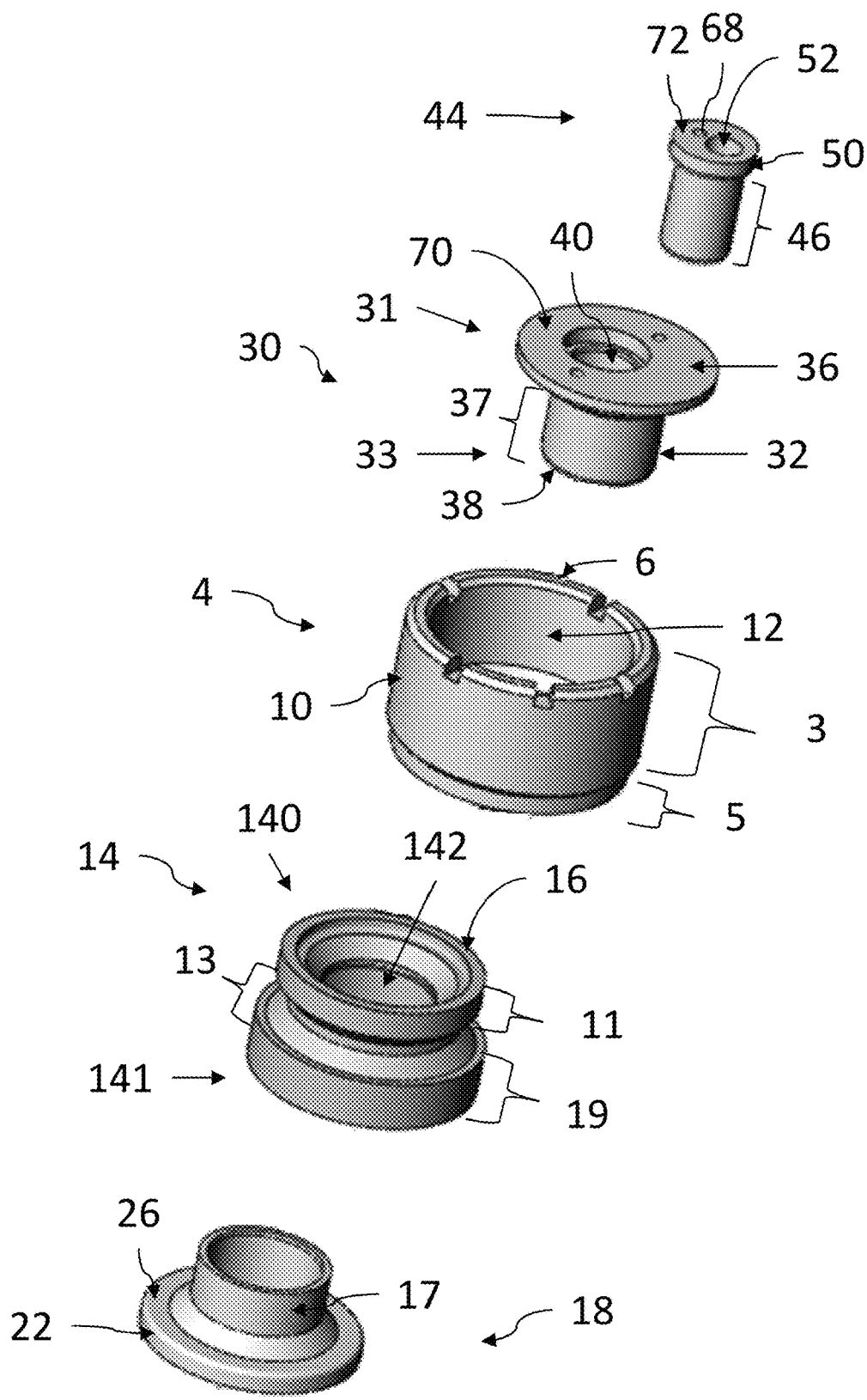
FIG. 2A illustrates an exploded assembly view of the vibration isolator of FIG. 1.

With reference to FIGS. 1 and 2A, there is depicted a vibration isolator 2 in accordance with a first embodiment. According to this embodiment, the vibration isolator 2 includes a housing 4 defined by a hollow interior and a pair of opposing open ends. As discussed in greater detail, the housing 4 is sized and configured to retain or receive a plurality of components including a resilient core 14, as well as a sleeve member 18 and a pair of bushing members; namely, a first bushing 30 and a second bushing 44. Each of the foregoing components are now described in greater detail.

Figure 2B:
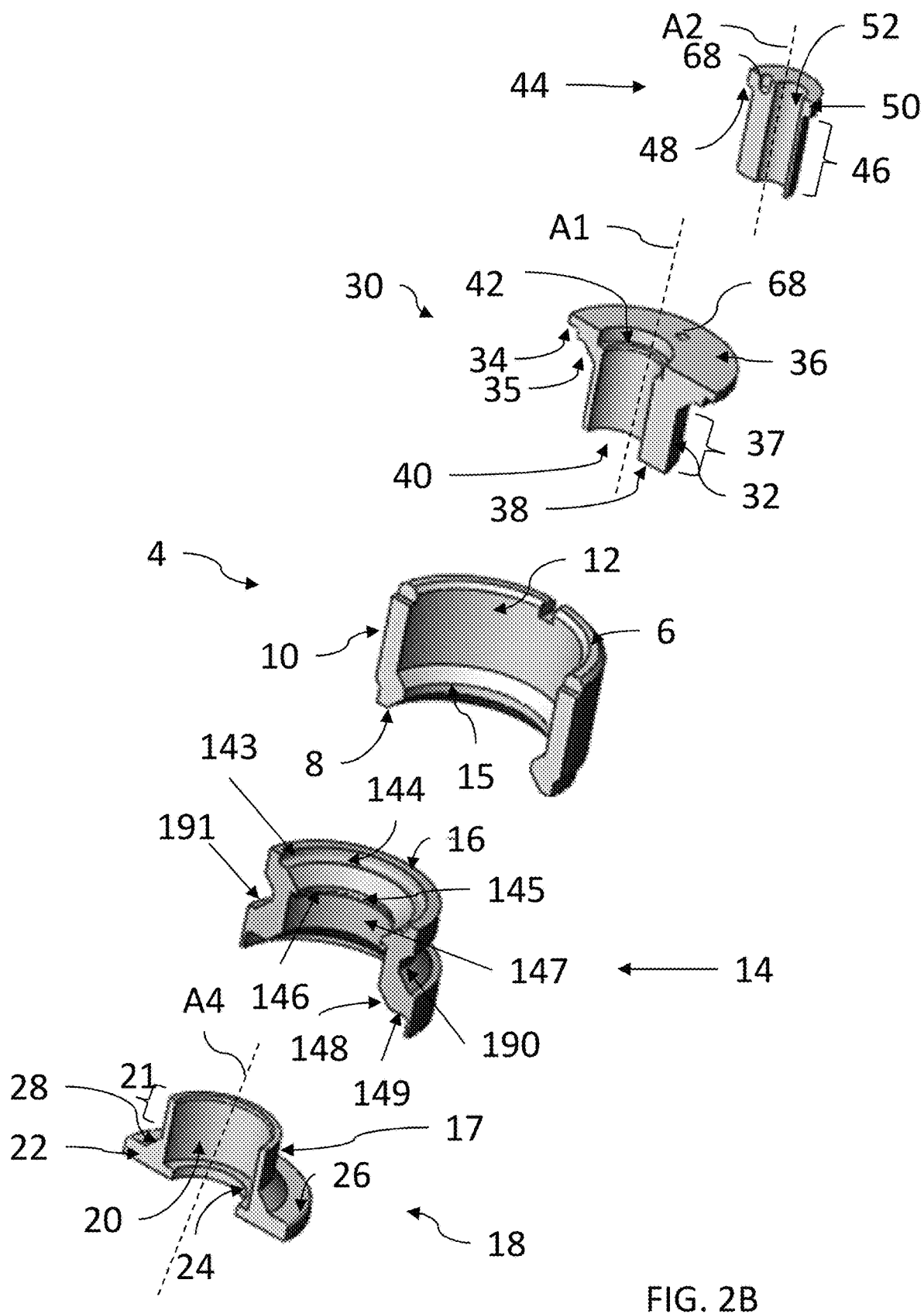
FIG. 2B illustrates the exploded assembly view of the vibration isolator of FIGS. 1-2A, shown in section.
Figure 2C:
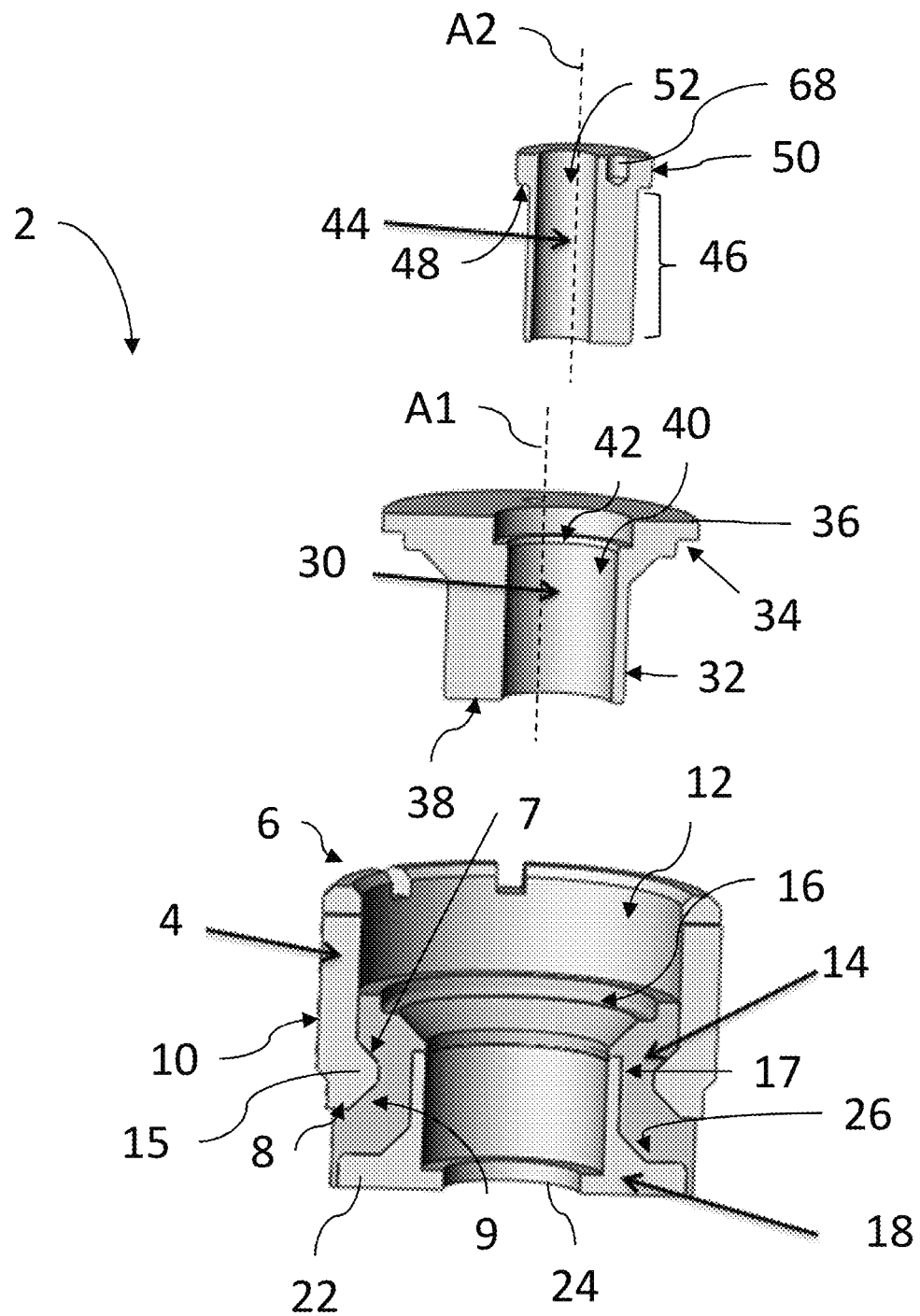
FIG. 2C illustrates a partially exploded assembly view of the vibration isolator of FIGS. 1-2B.
Figure 3:
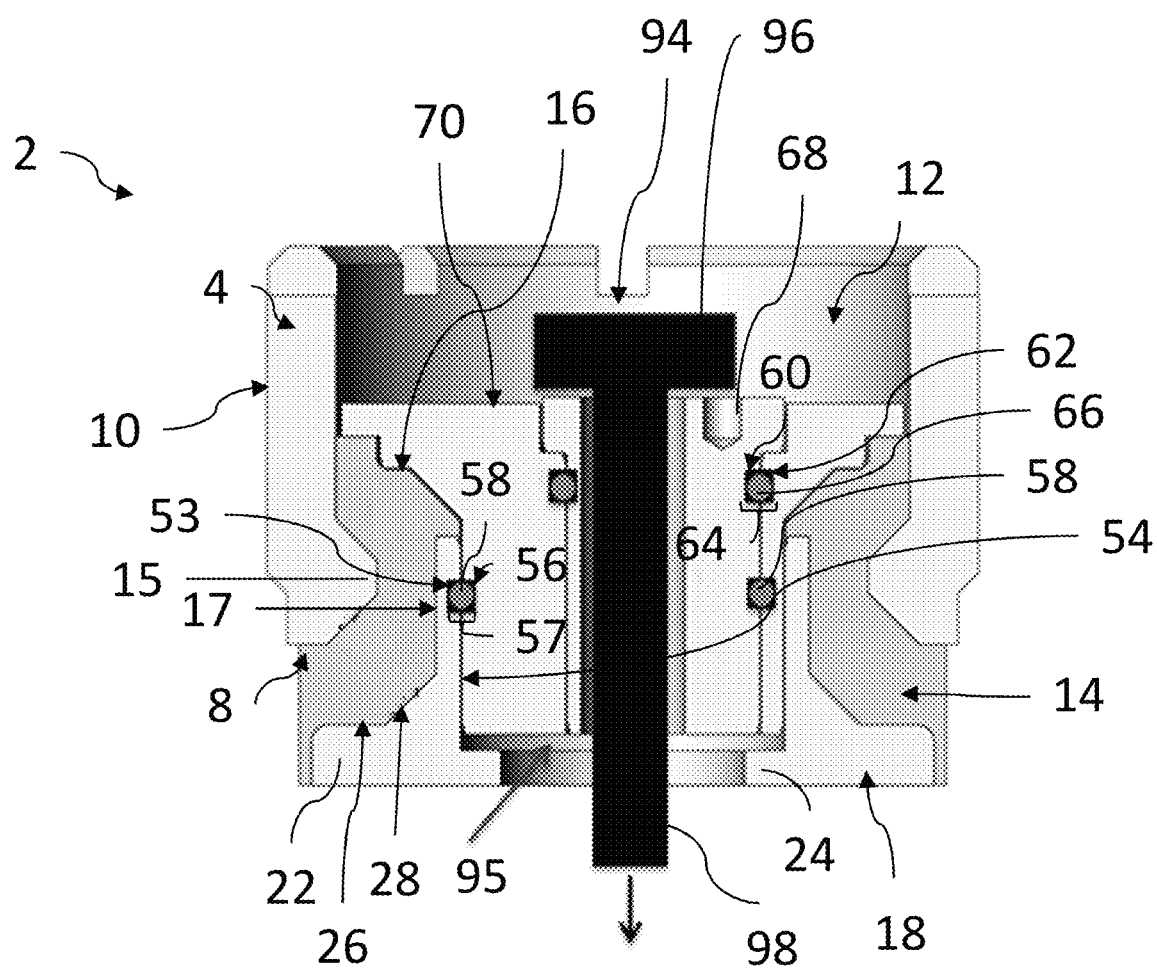
FIG. 3 illustrates a sectioned side elevational view of a vibration isolator of FIGS. 1-2C as assembled.

First and with reference to FIGS. 1-3, the housing 4 is defined by a substantially cylindrical configuration including the pair of open ends and the hollow interior. The open ends of the housing 4 are bounded by respective top and bottom surfaces 6, 8. The housing 4 is further defined by having an outer surface or wall 10 and an inner surface or wall 12. According to this embodiment, the outer surface 10 defines an external diameter of the housing 4, which is substantially constant over an upper cylindrical portion 3 of the housing 4. As shown most clearly in FIGS. 2A and 2C, the upper cylindrical portion 3 of the housing 4 transitions radially inwardly to a second external diameter at a bottom portion 5 of the housing 4.

Still referring to FIGS. 2A and 2C, the inner surface 12 of the housing 4 defines an internal diameter of the housing 4 which is substantially constant with the exception of an inwardly radially protruding portion 15 formed at the bottom portion 5 of the housing 4. According to this embodiment, the inwardly radially extending protrusion 15 is defined by an upper or top tapered wall 7, and a lower or bottom tapered wall 9, the protrusion 15 defining a circumferential necked portion. The housing 4 can be formed of a metal or any suitable structural material.

According to this embodiment and with reference to FIGS. 1-3, the resilient core 14 is a molded component made from an elastomeric material, such as but not limited to a natural rubber, silicone, polybutadiene, or blends thereof, which is securely attached to the bottom portion 5 of the housing 4. In an embodiment, the resilient core 14 has a axial to radial stiffness ratio of anywhere between about 0.5 to 2.0, though this parameter can be suitably varied. In an embodiment, the resilient core 14 is substantially isoelastic, allowing the core to be responsive to applied loads in each dimension.

As noted, the resilient core 14 is designed to be fitted within the housing 4 and is defined by respective upper 140 and lower ends 141, including an opening 142 extending through the length of the core 14. According to this embodiment, the outer contour of the resilient core 14 is defined by an upper cylindrical portion 11 having an annular surface which transitions via an inwardly radial surface 190 to a second annular surface 13 and in which the second annular surface 13 transitions radially outward via a surface 191 to a third annular surface 19. Also and according to this embodiment, the diameter of the first annular surface 11 is larger than that of the second annular surface 13 and in which the third annular surface 19 has the largest relative diameter. As discussed herein, the second annular surface 13 and the inwardly and outwardly transitioning surfaces 190, 191 correspond to the inwardly extending projection 15 of the housing 4.

The inner contour formed by the opening 142 of the resilient core 14 also varies in diameter between the upper and lower ends 140, 141 thereof. More specifically, the upper end 140 is defined by a top surface 16 in which the opening 142 is defined by a first annular surface 143 having a first inner diameter extending axially (downwardly) into the opening 142. An annular shoulder 144 projecting radially inwardly depends from the bottom of the first annular surface 143. The diameter of the opening 142 then transitions inwardly from the defined annular shoulder 144 along a conically defined section that extends radially inwardly to a second annular surface 145 that forms a necked section of the opening 142. The opening 142 then extends radially outward forming an upper annular shoulder 146 and a third annular surface 147, respectively, the latter having a substantially constant diameter that extends axially to an outwardly tapering conical surface 148 and a shoulder 149 formed adjacent the lower end 141 of the resilient core 14.

The sleeve 18 is designed to be fitted within the lower end 141 of the resilient core 14 and is defined by an upper cylindrical portion 21, a lower flanged portion 22, and a transitional portion 28 between the upper and lower portions 21, 22. According to the depicted embodiment, shown most particularly in FIGS. 2C and 3, the upper cylindrical portion 21 is defined by a first outer diameter that is substantially smaller than that of the lower flanged portion 22 wherein the transitional portion 28 is defined by an outwardly tapered conical surface therebetween. The sleeve 18 is further defined by a pair of opposing open ends and a through aperture 20 in which the inner diameter of the aperture 20 is substantially constant over its length with the exception of an inner shoulder 42 formed at the lower end of the sleeve 18. The sleeve 18 can be fabricated from any suitable structural material, such as a metal, and according to this embodiment is made from aluminum.

With continued reference to FIGS. 1-3, the first bushing 30 is defined by a body having upper and lower ends 31, 33 as well as an eccentrically disposed axial opening 40 extending therethrough. The eccentrically disposed axial opening 40 is parallel to, but spaced apart from, a defined center longitudinal axis A1. As discussed herein, the first bushing 30 is configured to be fitted within the upper portion 3 of the housing 4 and is engaged with the resilient core 14.

The body of the first bushing 30 is defined by an upper flange 36 and a lower engagement portion 37, each being further defined by an outer or exterior surface. According to this embodiment, the outer diameter of the upper flange 36 is larger than that of the lower engagement portion 37, wherein the flange 36 includes a bottom surface 34 that inwardly extends to an annular outer surface 32 that transitions via a conical surface 35 to the lower engagement portion 37, the latter being substantially cylindrical and extending axially to the lower end 33 of the bushing 30. According to the herein described embodiment, the through opening 40 is defined by a first diameter at the top of the opening 40 adjacent the upper end 31 of the bushing 30, the opening 40 forming a shoulder 42 that transitions the opening 40 to a second, smaller diameter extending along the majority of the axial length of the through opening 40 to the lower end 33. Each of the first and second bushings 30, 44 can be fabricated from any suitable structural material, such as a metal, and according to this embodiment each of the bushings 30, 44 is made from aluminum.

The second bushing 44 is configured to be fitted within the through opening 40 of the first bushing 30 according to this embodiment. Still referring to FIGS. 1-3, the second bushing 44 is defined by a substantially cylindrical body having an upper flange 50 and a lower cylindrical portion or shaft 46. Similar to the first bushing 30, the second bushing 44 has an aperture 52 axially extending through the extent of the second bushing 44 and more specifically along a defined longitudinal axis A2. According to the depicted embodiment, the second bushing 44 is an eccentric bushing in which the aperture 52 is parallel to, but offset from, the longitudinal axis A2. Each of the first bushing 30 and the second bushing 44, according to this embodiment, can include at least one alignment recess 68 that is formed in the upper flanges 36, 50 of the first and second bushing 30, 44, respectively. The at least one alignment recess 68 is configured to receive a tool (not shown) for rotating the first and second bushing 30, 44, respectively, within the housing 4.

Returning to FIGS. 2A-3 and with particular reference to the assembled depiction at FIGS. 2C and 3, the resilient core 14 is disposed within the lower portion 5 of the housing 4. In the assembled position, the second annular surface 13 of the resilient core 14 conforms to the inwardly extending protrusion 15 and the bottom surface 8 of the housing 4, in which the upper cylindrical portion 11 of the core 14 engages the inner surface 12 of the housing 4. In the assembled position, the third annular surface 19 of the core 14 extends below the bottom surface 8 of the housing 4 and in which the top surface 16 of the resilient core 14 encircles the inner surface 12 of the housing 4 to form a ledge. The sleeve 18 is disposed within the lower end 141 of the resilient core 14 abutting the resilient core 14 such that the resilient core 14 is sandwiched between the housing 4 and the sleeve 18.

The shape of the inwardly extending protrusion 15 of the housing 4 can be mirrored by the shape of the outer surface 17 of the sleeve 18. In an embodiment, illustrated by FIG. 3, the protrusion 15 extending from the bottom of the inner surface 12 of the housing 4 is defined by the tapered upper and lower walls 7, 9. In this embodiment, the lower flanged portion 22 transitions to the outer surface 17 of the sleeve 18 in which the angle of the transition portion 28 of the sleeve 18 corresponds to the angle of the tapered lower wall 9 of the protrusion 15 to create a secure fit. The resilient core 14 conforms with the outer surface 17 of the sleeve 18 as well as the inwardly extending protrusion 15 and inner surface 12 of the housing 14. Accordingly and according to this embodiment, the shape of the second annular surface 13 of the resilient core 14 conforms with the shape of the inwardly extending protrusion 15 of the housing 4 and the exterior shape of the sleeve 18.

Figure 4:
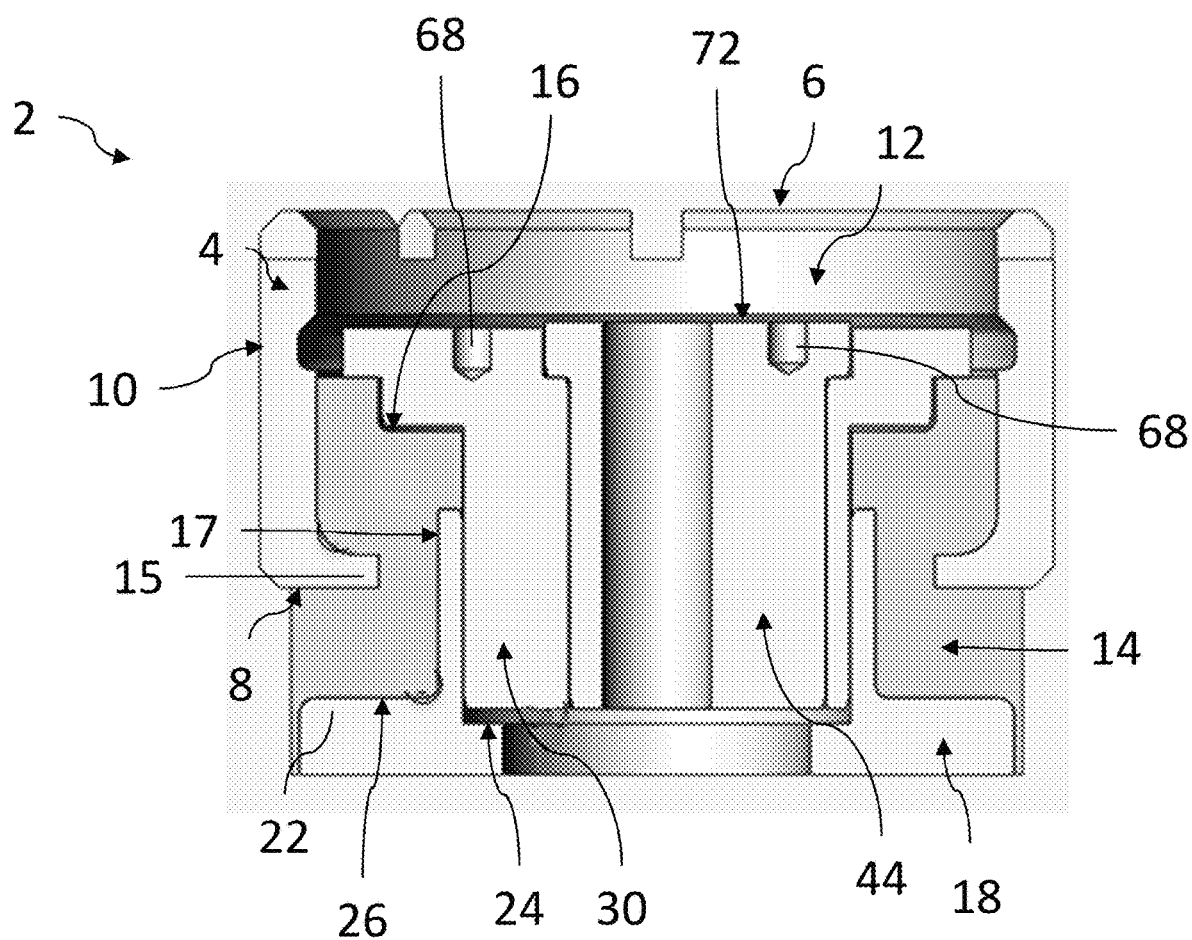
FIG. 4 illustrates a sectioned side elevational view of a vibration isolator in accordance with another embodiment.

For purposes of the inventive concepts described herein, it should be noted that the design of the isolator housing 4 and the sleeve 18 can easily be varied with the preceding being an example. For example, and according to another embodiment, illustrated by FIG. 4, the housing 4 is defined by substantially planar inner and outer walls 12, 10 extending over the length of the housing 4, with the exception of a bottom radially inwardly extending projection 15. In this embodiment, the transitional portion 28 of the sleeve 18 forms a ninety (90) degree angle between the upper cylindrical portion 21 and the flanged portion 22. While particular examples of surface shapes have been described herein, it is to be understood that other suitable shapes are contemplated.

The resilient core 14 is fixedly coupled to both the housing 4 and the sleeve 18 in any suitable manner. For example, the resilient core 14 can be mold bonded to the housing 4 and sleeve 18. In another example, the resilient core 14 can be coupled to the housing 4 and sleeve 18 with a suitable adhesive. By fixedly coupling to the housing 4 and sleeve 18, the resilient core 14 will not be subject to friction caused by vibration of the vibration isolator 2. Thus, the life of the resilient core 14 is extended, as compared to a typical, loose elastomeric grommet. In addition, vibration of the resilient core 14, and the resulting movement relative to the housing 4 and the sleeve 18, is reduced or even eliminated, thereby reducing the natural frequency of the vibration isolator 2.

Returning to FIGS. 2A-4, the first bushing 30 is received or disposed within the sleeve 18 with the bottom surface 38 of the outer surface 32 resting upon the inner shoulder 24 and the bottom surface 34 of the flange 36 resting upon the top surface 16 of the resilient core 14. According to this embodiment, the top surface 16 of the resilient core 14 conforms to the shape of the bottom surface 34 of the upper flange 36 of the first bushing 30.

Figure 6:
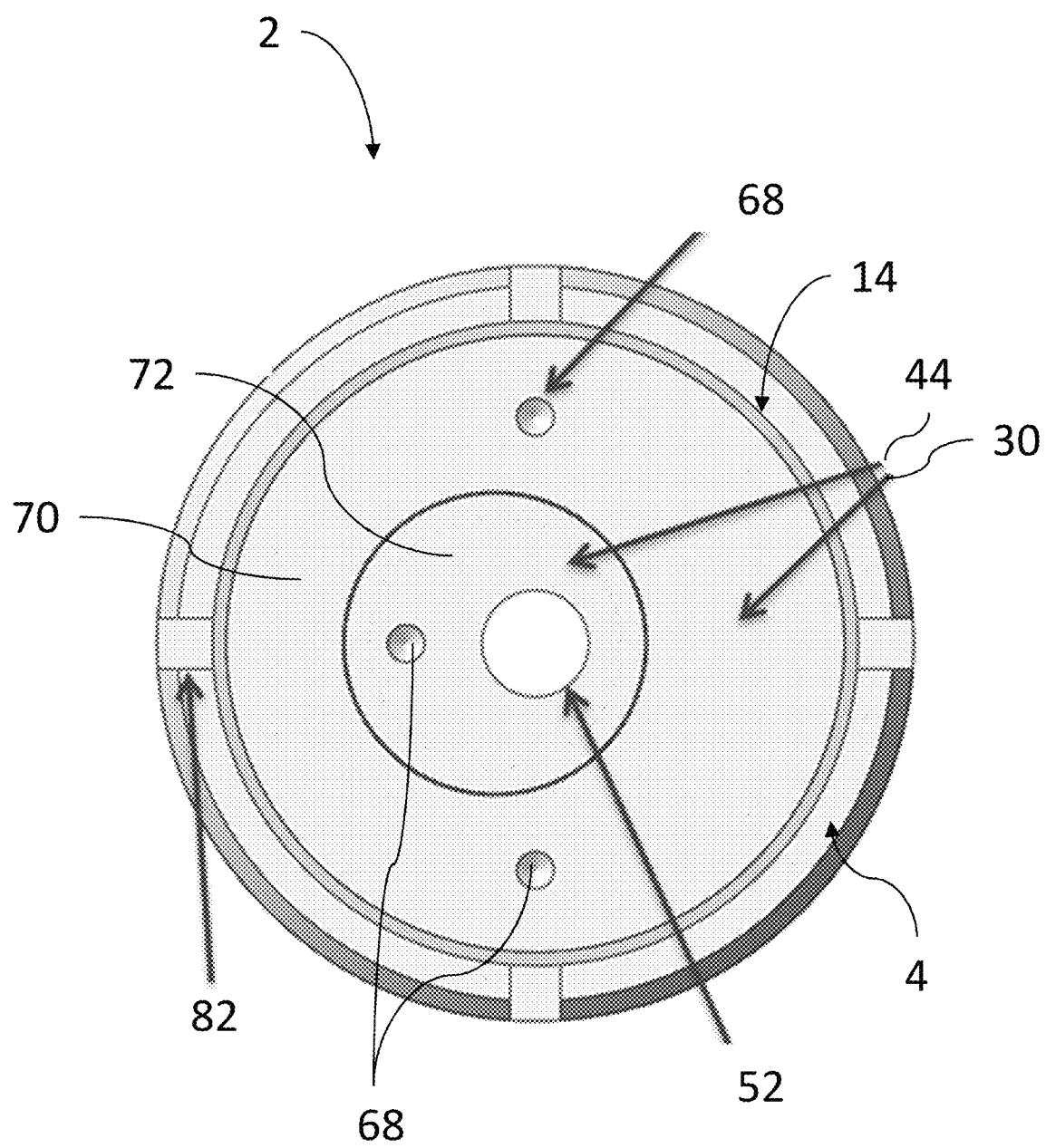
FIG. 6 illustrates a top plan view of the vibration isolator of FIGS. 1-4.
Figure 7:
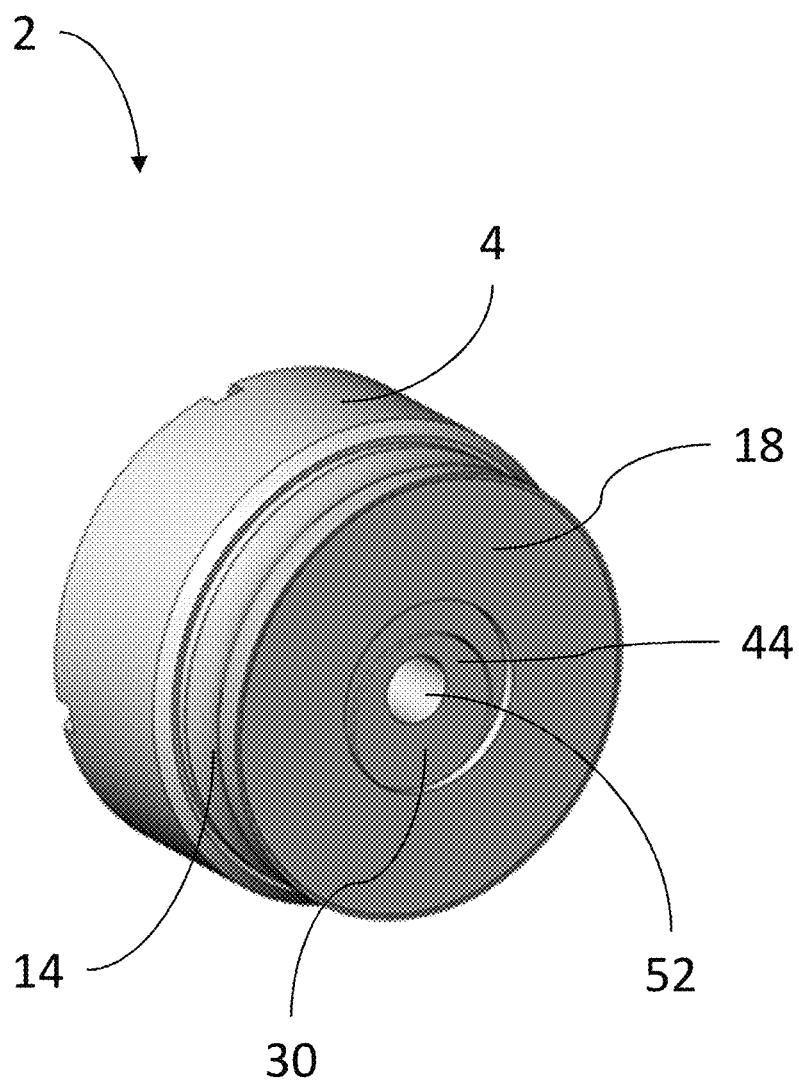
FIG. 7 illustrates a bottom perspective view of the vibration isolator of FIGS. 1-4.
Figure 8:
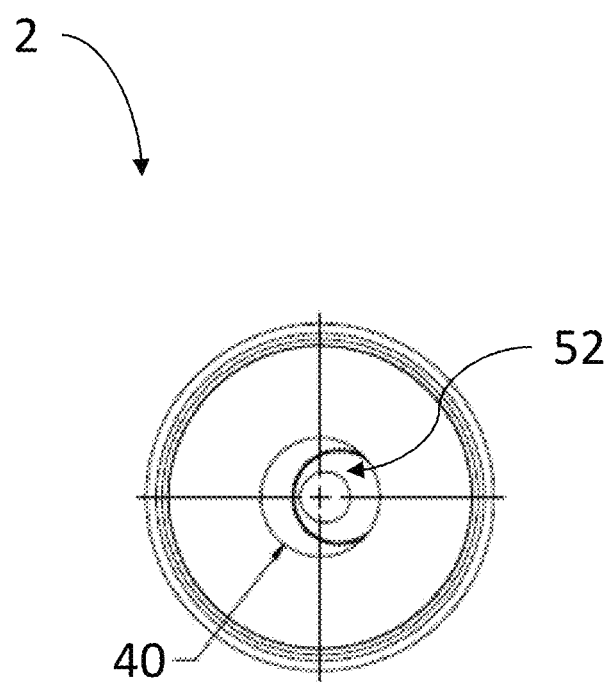
FIG. 8 a bottom plan view of the vibration isolator of FIGS. 1-4.
Figure 9:
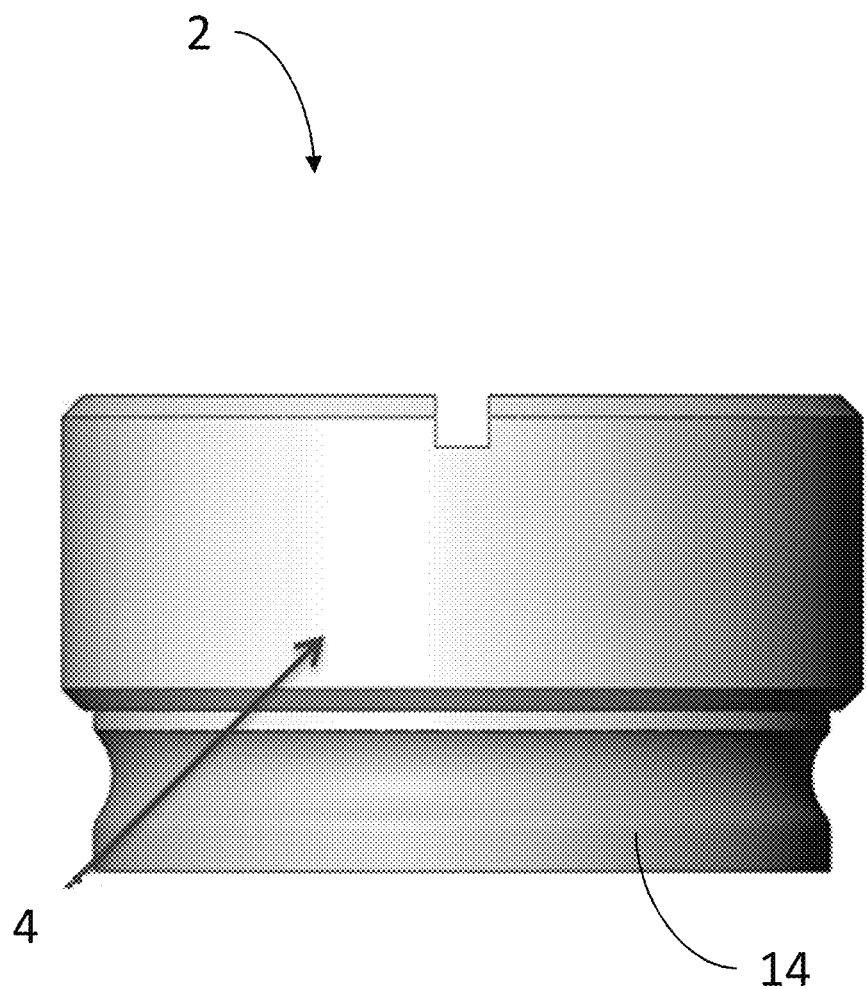
FIG. 9 illustrates a side view of the vibration isolator of FIGS. 1-4.
Figure 10:
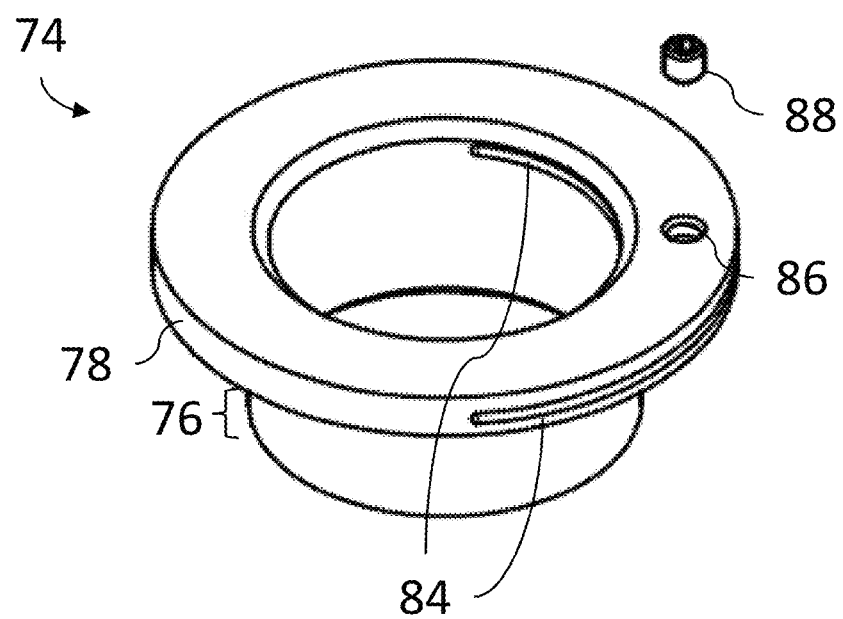
FIG. 10 illustrates a top perspective view of a mounting sleeve in accordance with an embodiment.
Figure 11A:
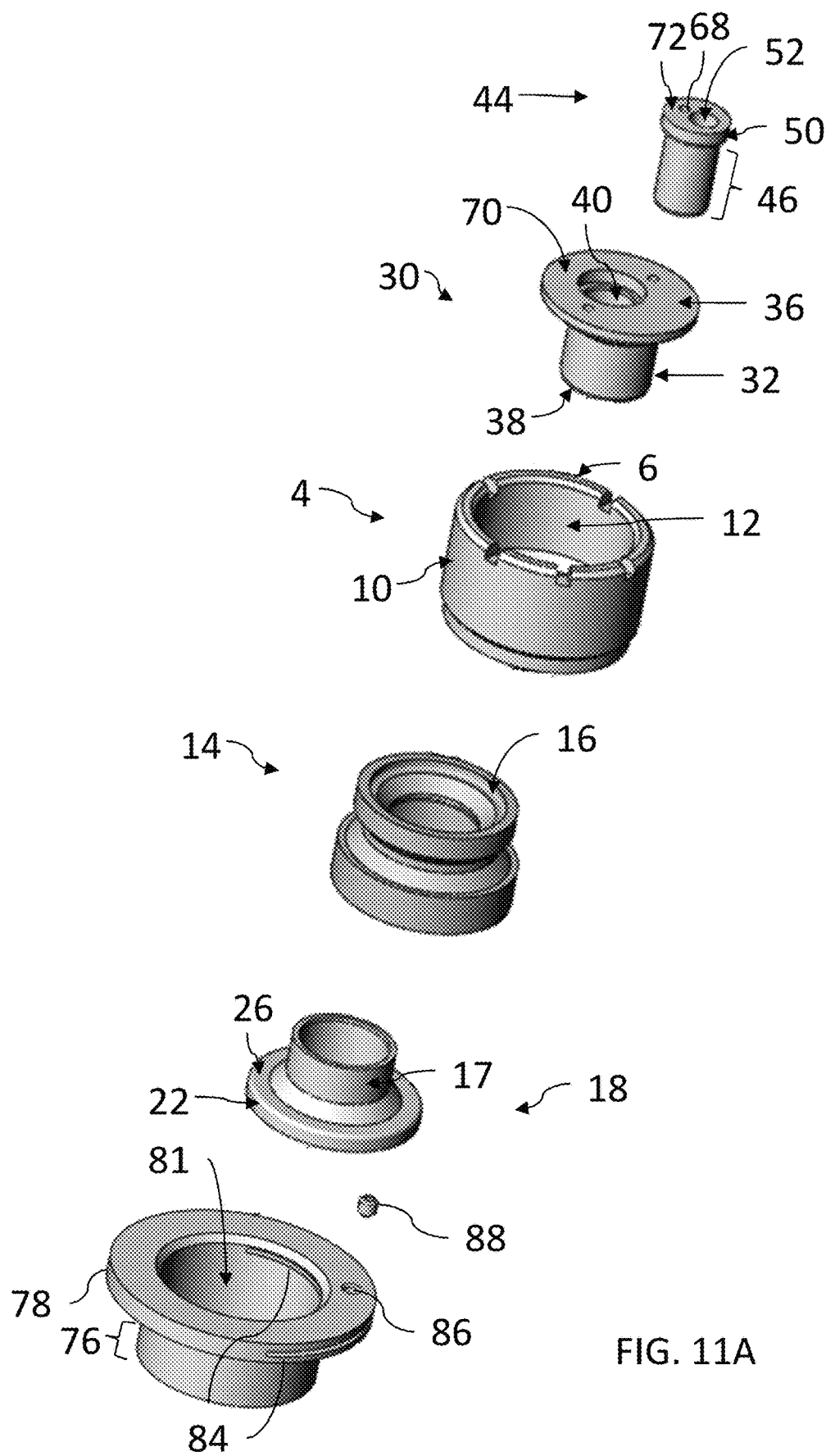
FIG. 11A illustrates an exploded assembly view of a vibration isolator and mounting sleeve, in accordance with an embodiment.
Figure 11B:
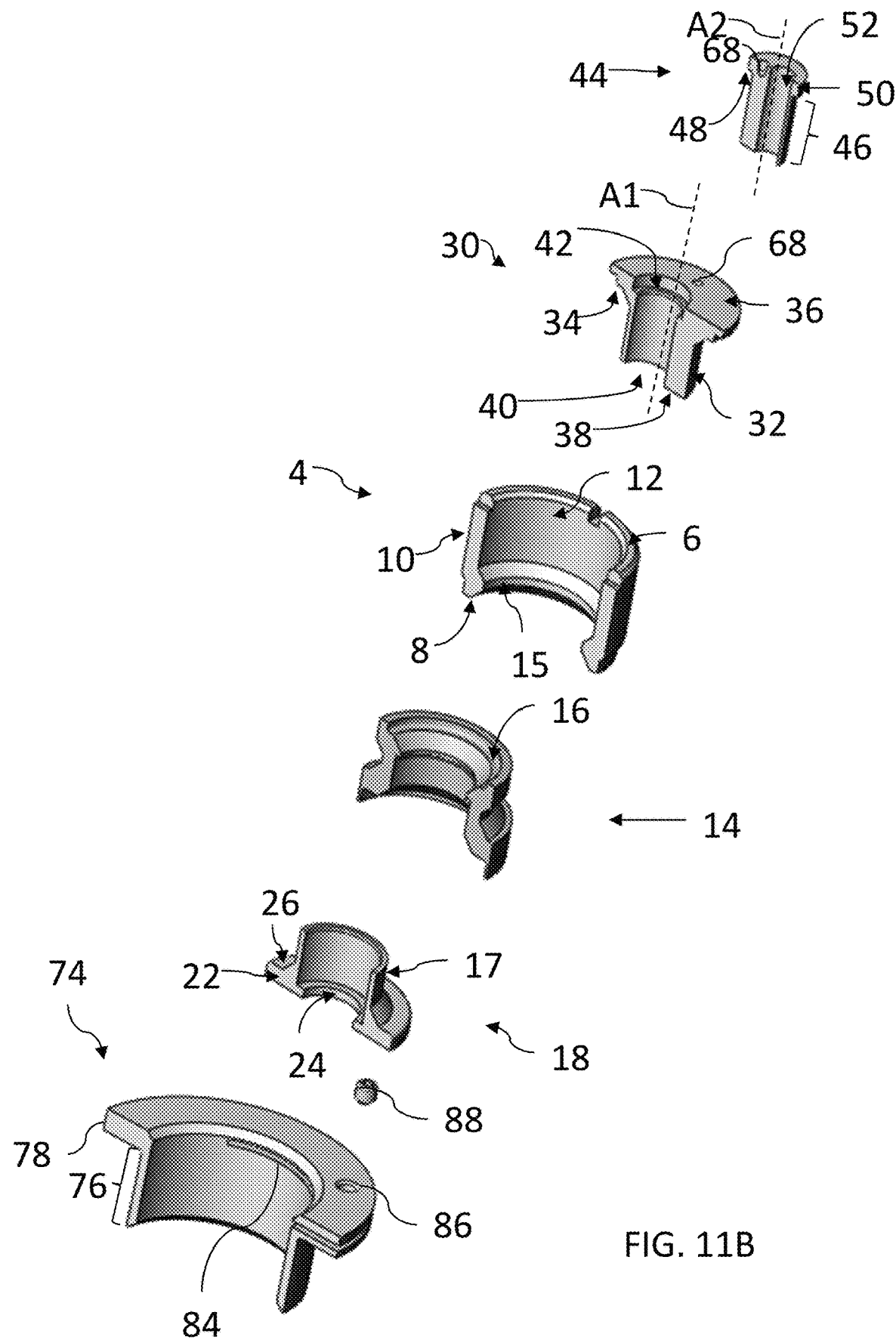
FIG. 11B illustrates the exploded assembly view of the vibration isolator and mounting sleeve of FIG. 11A, taken in section.
Figure 11C:
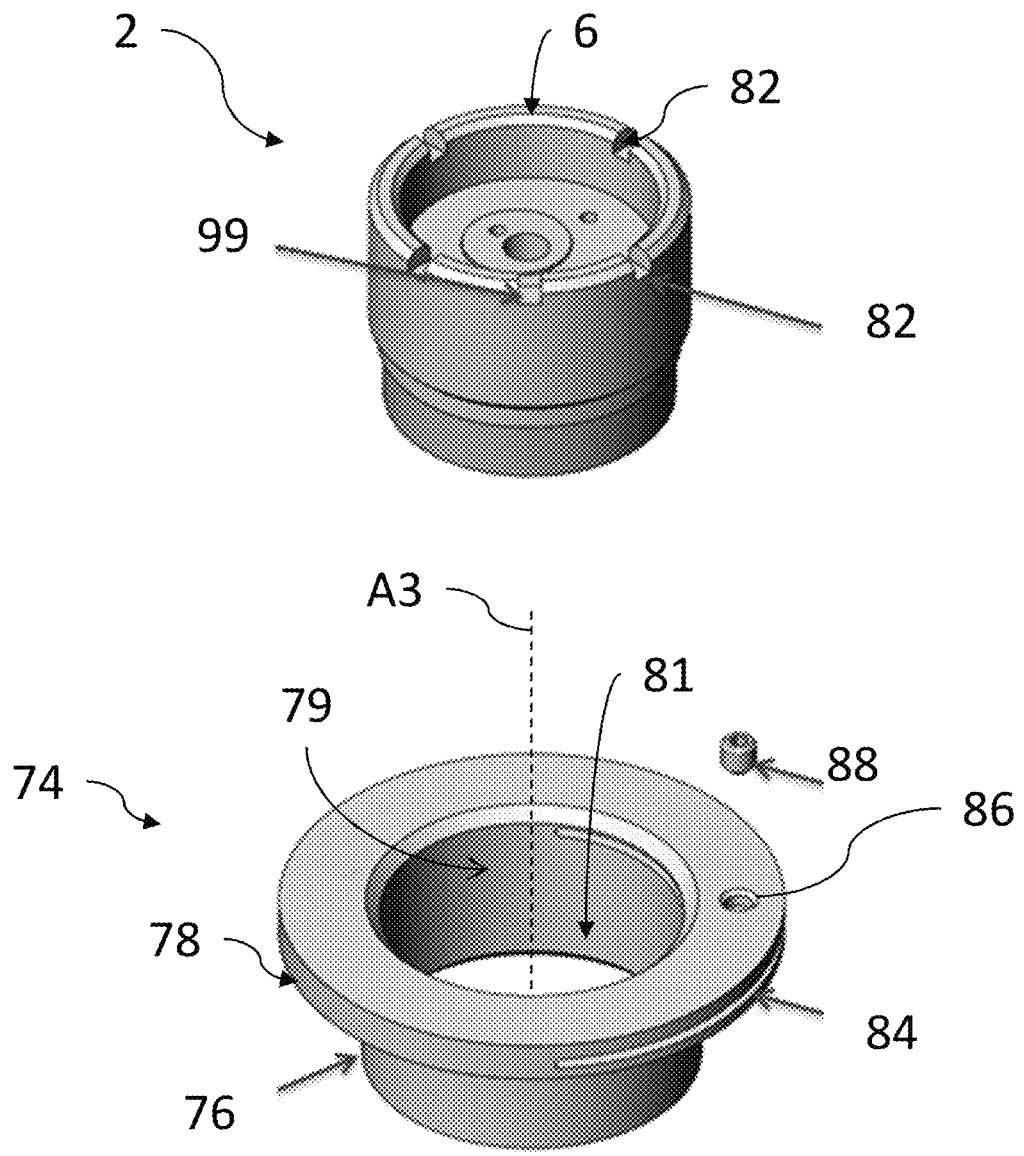
FIG. 11C illustrates a partially exploded assembly view of an assembled vibration isolator with a mounting sleeve of FIGS. 11A-B.
Figure 12:
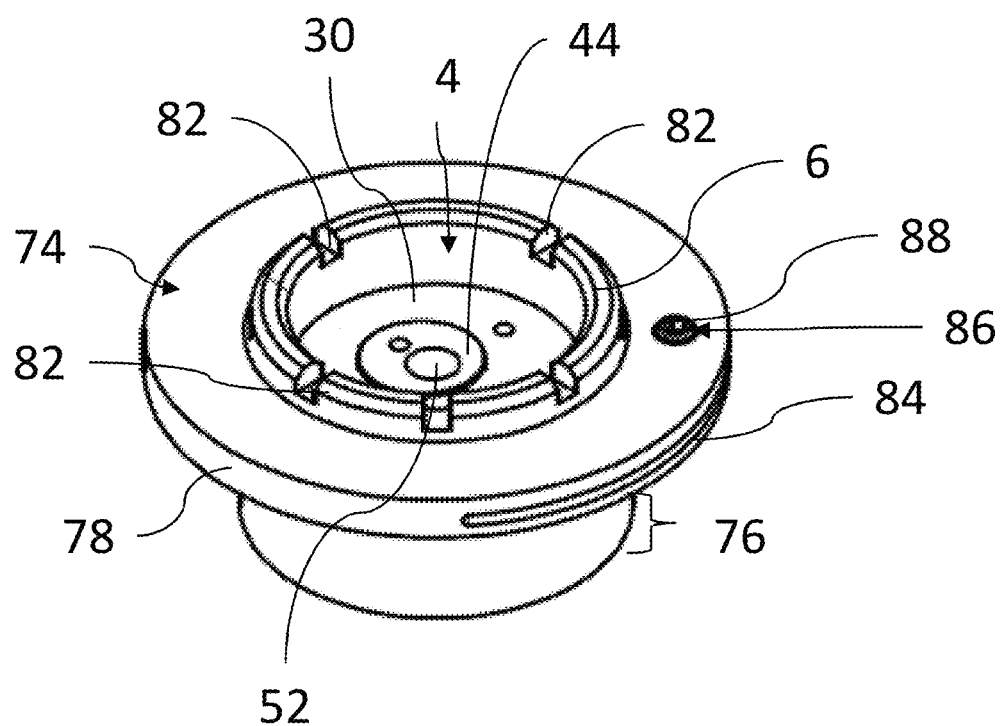
FIG. 12 illustrates a top perspective view of the assembled vibration isolator and mounting sleeve of FIGS. 11A-C.
Figure 13:
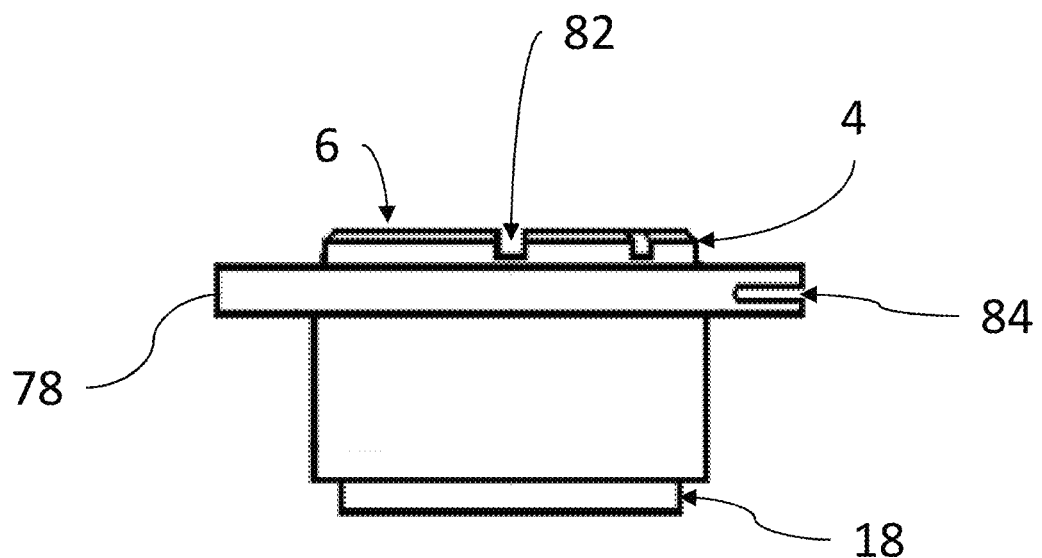
FIG. 13 illustrates a side view of the assembled vibration isolator and mounting sleeve of FIG. 12.

As illustrated by FIGS. 2A-4, the second bushing 44 is disposed within the through opening 40 of the first bushing 30 with the shaft 46 of the second bushing 44 extending along the length of the through opening 40 of the first bushing 30. In this position, the bottom surface 48 of the flange 50 of the second bushing 44 rests upon the formed shoulder 42 of the first bushing 30. In an embodiment, the shape of the through opening 40 of the first bushing 30 conforms to the exterior shape of the second bushing 44. In an embodiment, illustrated by FIGS. 7-8, the eccentric first bushing 30 and the eccentric second bushing 44 can be oriented such that the first through opening 40 and the aperture 52 overlap. The overlap of the through opening 40 and the aperture 52, allows for rotational travel of the aperture 52. For example, the aperture 52 can travel +/−0.2 inches, allowing "blind" rotational alignment with a mounting surface (not shown). The at least one alignment recess 68 (FIG. 6) of the first bushing 30 and the second bushing 44 can be used to rotationally align the first bushing 30 and the second bushing 44 within the vibration isolator 2. For example, the at least one alignment recess 68 can receive a tool (not shown) for rotating the first and second bushings 30, 44, respectively.

Figure 5:
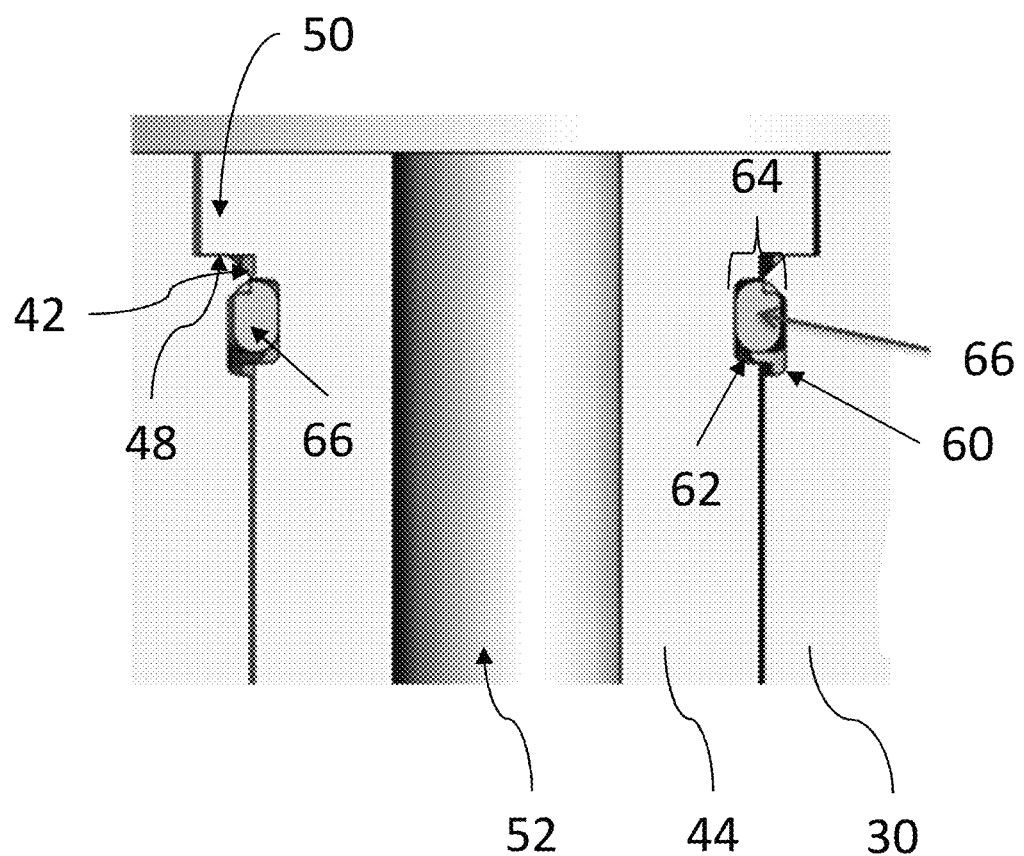
FIG. 5 illustrates an enlarged sectioned view of the vibration isolator of FIGS. 1-4.

Therefore, the first bushing 30 is retained within the sleeve 18 and the second bushing 44 is retained within the first bushing 30. According to this embodiment and as illustrated in FIGS. 3 and 5, a first circumferential retention groove 53 is formed in the inner surface 54 of the sleeve 18 and a second circumferential retention groove 56 is formed in the outer surface 32 of the shaft of the first bushing 30. When the first bushing 30 is received within the sleeve 18, the first retention groove 52 of the inner surface 54 of the sleeve 18 and the second retention groove 56 in the outer surface 32 of the shaft 37 align with one another such that the inner surfaces of the grooves 52, 56 form a first retention track 57 encircling the outer circumference of the first bushing 30. A first retention member 58, such as an o-ring, can be disposed within the first retention track 57 to retain the first bushing 30 within the sleeve 18. Similarly, a third circumferential retention groove 60 is formed in the through opening 40 of the first bushing 30 below the ridge 42 and a fourth circumferential retention groove 62 is formed in outer surface of the shaft 46 of the second bushing 44. When the second bushing 44 is disposed within the first bushing 30, the third retention groove 60 of the inner surface of the through opening 40 aligns with the fourth retention groove 62 of the outer surface of the shaft 46 such that the inner surfaces of the grooves 60, 62 form a second retention track 64 in which a second retention member 66 is disposed. The first retention member 58 and the second retention member 66 serve to retain the first and second bushings 30, 44 in position within the vibration isolator 2. In addition, the retention members 58, 66 prevent free rotation of the first and second bushings 30, 44, thereby maintaining alignment of the first and second bushings 30, 44 within the vibration isolator 2.

As illustrated by FIGS. 10-13, the vibration isolator 2 can be retained within a mounting sleeve 74. According to this embodiment, the mounting sleeve 74 includes a cylindrically shaped lower portion 76 and an upper flange or rim 78, extending along a defined center longitudinal axis A3 of the mounting sleeve 74 and more specifically through a defined axial passage 81 of the sleeve 74 between opposing open upper and lower ends that is sized to accommodate the isolator 2. In the depicted embodiment, the upper flange 78 of the mounting sleeve 74 includes a slot 84 extending partially through the flange 78 and over a portion of the circumference thereof, the slot 84 extending substantially perpendicularly to the center longitudinal axis A3 of the mounting sleeve 74. The flange 78 further includes a mounting hole 86 disposed above the formed slot 84 that is configured to receive a fastener 88, such as a set screw, wherein the edges of the slot 84 can be expanded or compressed away or toward each other upon securement of the fastener 88.

Figure 14:
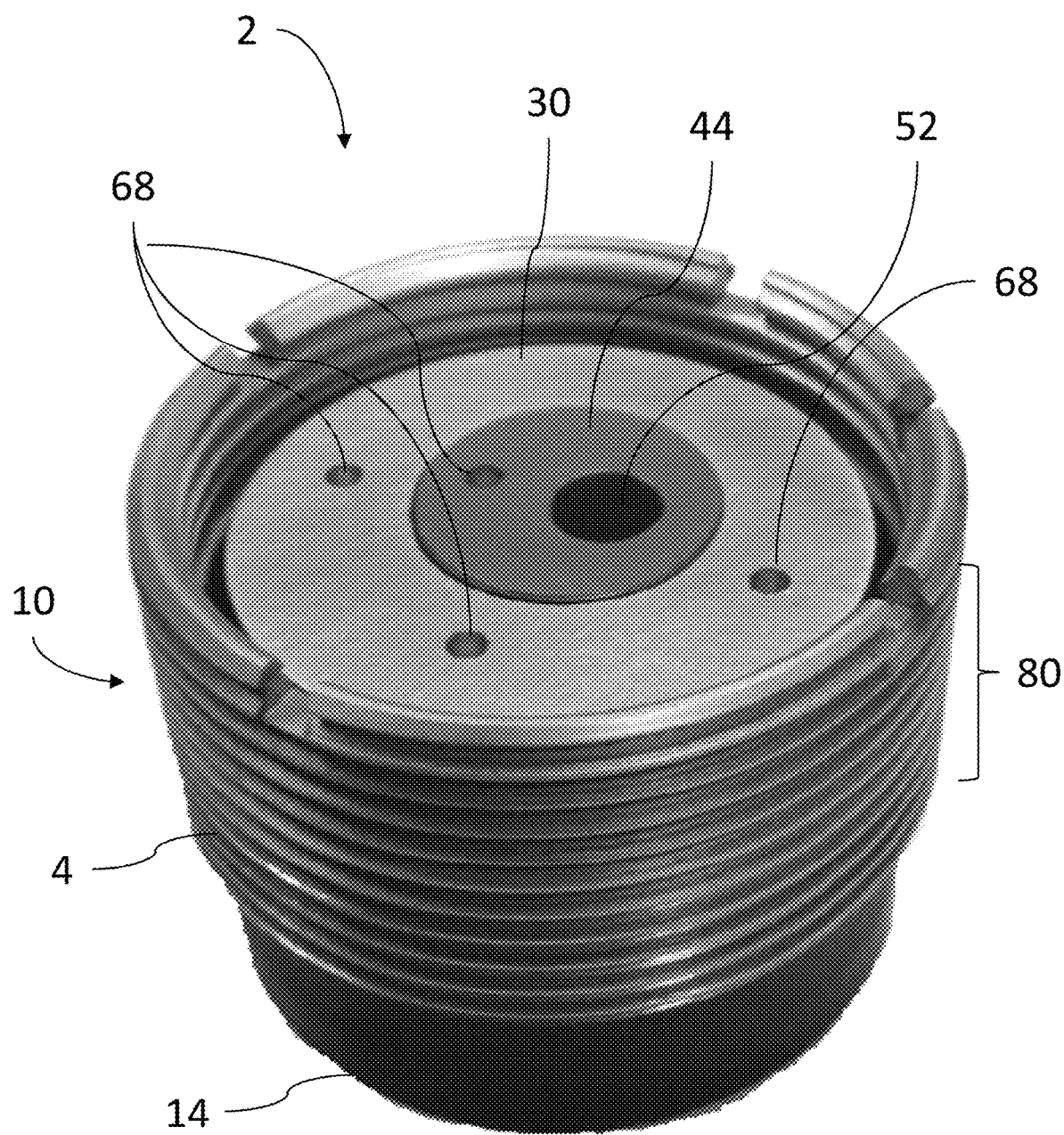
FIG. 14 illustrates a top perspective view of the vibration isolator of FIG. 12.

According to this embodiment, an inner surface 79 of the mounting sleeve 74 can act as a mounting surface which engages an outer surface of the vibration isolator 2. According to at least one version, the outer surface 10 of the housing 4 can include a set of threads (FIG. 14), wherein the threads 80 are configured to threadably engage a corresponding threaded inner surface 79 of the mounting sleeve 74.

The vibration isolator 2 can be positioned within the mounting sleeve 74 at a predetermined height, such as an installation height. To permit this adjustment, the top surface 6 of the housing 4 can include at least one formed notch 82 (FIGS. 11C, 12), in which a tool (not shown), such as a spanner wrench, can be disposed for adjusting the height of the vibration isolator 2 within the mounting sleeve 74. According to this version, a plurality of notches 82 are formed in the top surface 6 in spaced relation. The specific number of notches 82 can be suitably varied.

The mounting sleeve 74 can include at least one feature for locking the vibration isolator 2 at a predetermined height within the mounting sleeve 74. In the illustrated embodiment, the slot 84 of the mounting sleeve 74 acts as a locking mechanism. More specifically and when the edges of the slot 84 are expanded or compressed, by securing the fastener 88 into the formed mounting hole 86 and into engagement with the upper portion of the formed slot 84, the threaded inner surface 79 becomes slightly distorted and the vibration isolator 2 is effectively locked into position within the mounting sleeve 74 that controls both height and rotation.

Figure 15:
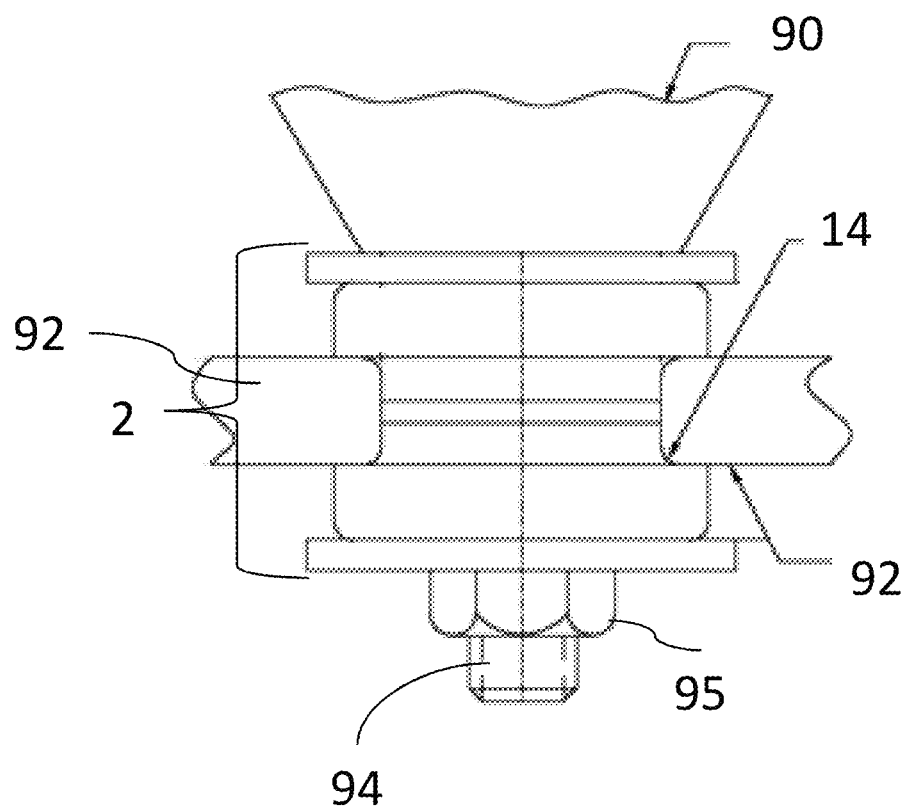
FIG. 15 illustrates a side elevational view depicting the installation of a vibration isolator in accordance with an embodiment.

As illustrated by FIG. 15, the vibration isolator 2 can mount a fixture or "monument" to a surface. In the depicted version, a monument 90, such as a piece of furniture in an aircraft, can be mounted to a structural rail 92 via the vibration isolator 2. In this example, a fastener 94, such as a bolt, extends through the vibration isolator 2 and is received in a receiving member 95, such as a nut, positioned on or beneath the structural rail 92. In an example, the fastener 94 extends through the bottom surface of the monument 90 and through the aperture 52 of the second bushing 30 such that the head 96 (FIG. 3) of the fastener 94 rests on the second bearing 44 and the shaft 98 of the fastener 94 extends through the sleeve 18. As the fastener 94 is installed, the head 96 of the fastener 94 exerts a force on the second eccentric bushing 44, which in turn exerts a force on the first bushing 30, which compresses the resilient core 14. Thus, the resilient core 14 is subject to both compression and shear forces. Moreover, the above-noted compression exerts a pre-load on the vibration isolator 2, reducing the natural frequency and increasing the flex life of the vibration isolator 2.

At least one vibration isolator 2 can be used in installing or mounting a monument 90. According to at least one version, at least four (4) vibration isolators 2 can be used per monument 90. It should be noted, however, that the number of vibration isolators 2 required for an installation can be varied based on the size and/or weight of the monument 90 and other factors. In an example, each vibration isolator is rated to carry a given load. A variety of models can be manufactured, each model rated to carry a different load. For example, models can be manufactured to carry 25, 50, and 100 pounds, respectively. In an example, the housing 4 of the vibration isolator 2 can include a marking indicative of the load the vibration isolator 2 is rated to carry. For example, the top 6 of the housing 4 can include a groove or notch 99 (FIG. 11C) that is color coded to indicate the rated load to the installer.

Figure 16A:
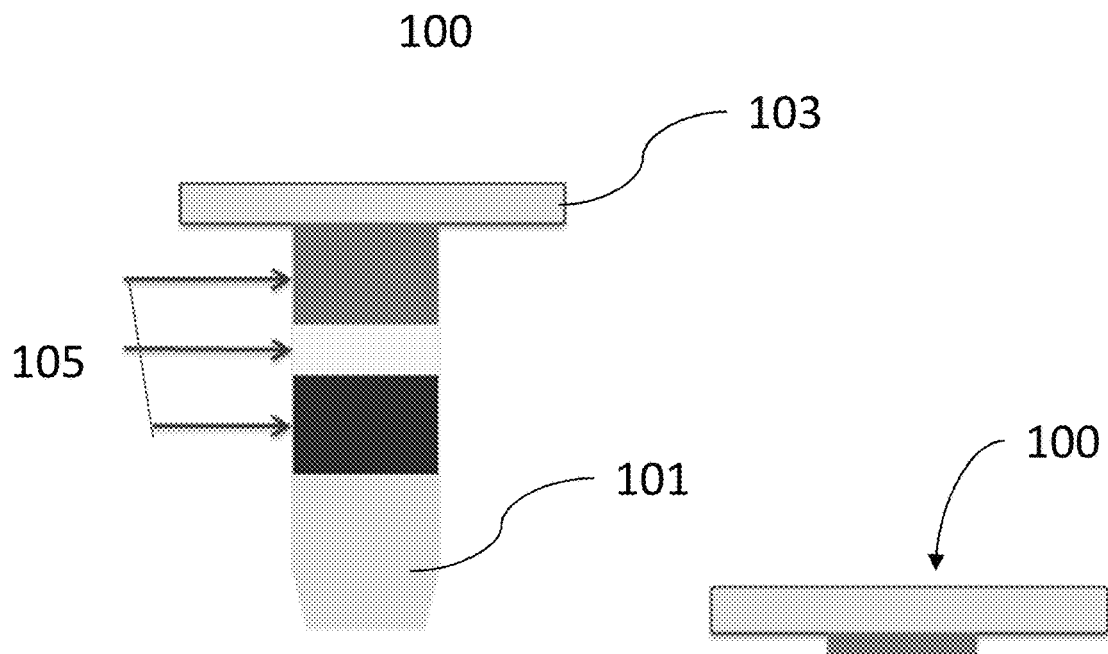
FIG. 16A illustrates a side elevational view of a mounting tool in accordance with an embodiment.
Figure 16B:
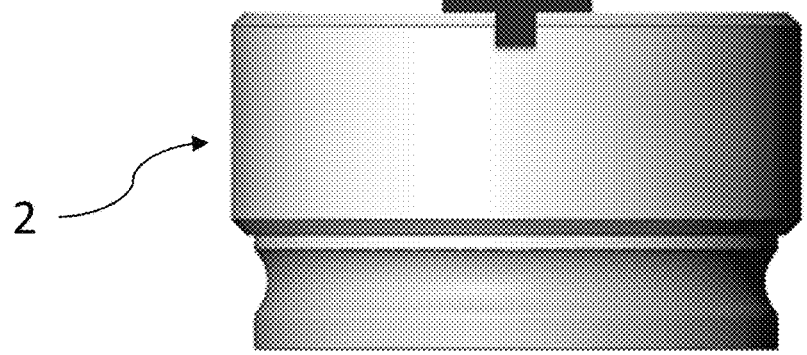
FIG. 16B illustrates a side view depicting the engagement of the mounting tool of FIG. 17A relative to a vibration isolator.

In some examples, installation areas are difficult to visualize. A mounting tool 100 (FIG. 16A) can be used to position the isolator 2 and, more specifically, the aperture 52 over the fastener receiving surface 95. In this example, the mounting tool 100 is defined by a bold shaped member having a shaft 101 sized to fit within the aperture 52 and a flanged head 103. The tool 100 can include a plurality of markings 105, such as colored sections, indicating the depth of the mounting tool 100 in spaced relation along a portion of the shaft 101 in varying colors (e.g., white, red, green) to indicate a height level. As illustrated in FIG. 16B, during installation, the mounting tool 100 can be inserted in the aperture 52 (not shown). When a predetermined marking is indicated, such as only a particular color showing, the position of the vibration isolator 2 is identified as correct, the mounting tool 100 is removed, and installation of the monument proceeds.

During operation, vibrational loads transmitted from the mounting surface to the monument can be isolated by the vibration isolator 2. Due to the bonding of the resilient core 14 to the surfaces of the housing 4 and the sleeve 18, vibration of the resilient core 14 relative to the housing 4 and sleeve 18 is reduced or even eliminated. Thus, a vibration isolator with a bonded resilient core 14, as described herein, has an improved performance as compared to a typical vibration isolator.

Figure 17:
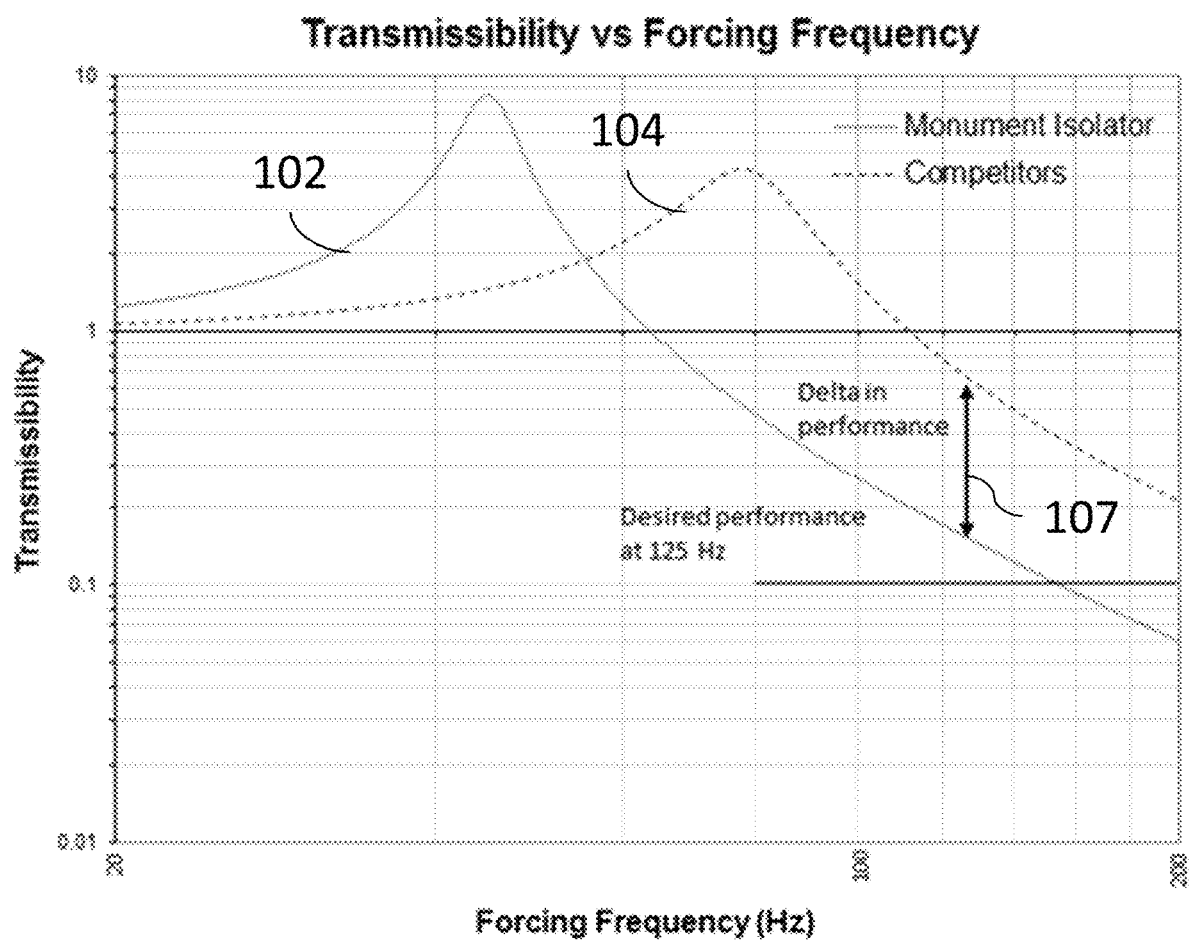
FIG. 17 is a graph contrasting the performance of a known vibration isolator with a vibration isolator of the present application.

The advantages of the herein described vibration isolator are shown graphically as compared to typically known versions. FIG. 17 is a graph illustrating the improved transmissibility versus forcing frequency of a bonded core isolator (curve 102) made in accordance with either of the embodiments illustrated in FIGS. 3 and 4, and as compared to a typical isolator (herein represented by curve 104), such as the MCB0006 isolator manufactured by the Lord Corporation. As shown in the depicted test results, the bonded core vibration isolator operates at a lower or reduced natural frequency in the range between about 30 to 55 Hz, such as at 45 Hz and exhibits 90% isolation at a frequency of about 125 Hz, as compared to the known isolator exhibiting a much higher natural frequency and as denoted by the indicated delta 107.

PARTS LIST FOR FIGS. 1-17

2 vibration isolator
3 upper portion, housing 4 housing
5 lower portion, housing
6 top surface, housing
7 upper tapered wall
8 bottom surface, housing
9 lower tapered wall
10 outer surface, housing
11 upper cylindrical portion
12 inner surface
13 second annular surface
14 resilient core
15 protrusion, inwardly extending
16 top surface, resilient core
17 outer surface, sleeve
18 sleeve
19 third annular surface
20 aperture, sleeve
21 upper cylindrical portion, sleeve
22 lower flanged portion, sleeve
23 inner surface
24 inner shoulder
26 top surface
28 transitional portion, sleeve
30 first bushing
31 upper end, first bushing
32 outer surface
33 lower end, first bushing
34 bottom surface
35 conical surface
36 upper flange, first bushing
37 lower engagement portion, first bushing
38 bottom surface, first bushing
40 opening, first bushing
42 shoulder
44 second bushing
46 shaft, second bushing
48 bottom surface, flange
50 upper flange, second bushing
52 aperture, second bushing
53 first retention groove
54 inner surface
56 second retention groove
57 first retention track
58 retention member
60 third retention groove
62 fourth retention groove
64 second retention track
66 second retention member
68 alignment recess
70 top surface
72 top surface
74 mounting sleeve
76 shaft, mounting sleeve
78 upper flange or rim, mounting sleeve
79 inner surface, mounting sleeve
80 threads
81 aperture, mounting sleeve
82 notches
84 slot, mounting sleeve
86 mounting hole
88 fastener
90 monument
92 structural rail
94 fastener
95 receiving surface
96 head
98 shaft
99 groove
100 mounting tool
101 shaft, mounting tool
102 curve
103 flanged head, mounting tool
104 curve
105 markings, shaft
140 upper end
141 lower end
142 opening
143 first annular surface
144 annular shoulder
145 second annular surface
146 upper annular shoulder
147 third annular surface
148 conical surface
149 shoulder
190 inwardly transitioning surface
191 outwardly transitioning surface
A1 axis
A2 axis
A3 axis While particular variations and illustrative figures having been used in the foregoing description, those of ordinary skill in the art will recognize that the variations and figures are not intended to be limiting. In addition, where methods and steps described above indicate certain events occurring in certain order, those of ordinary skill in the art will recognize that the ordering of certain steps may be modified and that such modifications are in accordance with those as would be apparent to a person of suitable skill in the field. Additionally, certain of the steps may be performed concurrently in a parallel process when possible, as well as performed sequentially as described above. Therefore, to the extent there are variations, which are within the spirit of the disclosure or equivalent to recited features in the claims, it is the intent that this patent will cover those variations as well.

What is claimed is:

1. A vibration isolator comprising:
a housing having a top surface, an opposing bottom surface and a hollow interior;
an open-ended sleeve having a hollow interior and an extending flange, the extending flange having a top surface and a bottom surface;
a resilient core, having a hollow interior, positioned between and fixedly coupled to the bottom surface of the housing and the top surface of the flange of the sleeve, the resilient core disposed within a portion of the hollow interior of the open-ended sleeve;
a first bushing disposed within the interior of the sleeve, the first bushing having a flange including a bottom surface that overlays a top surface of the resilient core; and
a second bushing disposed within an axial through opening of the first bushing in which the axial through opening is eccentrically disposed relative to a center longitudinal axis of the isolation assembly.

2. The vibration isolator of claim 1, wherein the bottom surface of the housing comprises an inwardly extending extension defined by a upper tapered wall and a lower tapered wall and wherein the open-ended sleeve is defined by an upper cylindrical portion, a lower flanged portion, and a transitional portion between the upper cylindrical portion and the lower flanged portion, the transitional portion angled to mirror the lower tapered wall of the housing.

3. The vibration isolator of claim 2, wherein the resilient core is coupled to the inwardly extending extension of the housing and to the upper cylindrical portion, lower flanged portion, and transitional portion of the open-ended sleeve.

4. The vibration isolator of claim 3, wherein the upper surface of the resilient core corresponds to a shape of an outer surface of the first bushing.

5. The vibration isolator of claim 1, wherein the bottom surface of the housing comprises an inwardly extending extension extending substantially perpendicularly to an outer surface of the housing and wherein the open-ended sleeve is defined by a lower flanged portion extending substantially perpendicularly to an upper cylindrical portion.

6. The vibration isolator of claim 5, wherein the resilient core is coupled to the inwardly extending extension of the housing and to the upper cylindrical portion and lower flanged portion of the open-ended sleeve, and conforms to a portion of an inner surface of the housing to form an upper surface.

7. The vibration isolator of claim 1, wherein the second bushing and the first bushing each include eccentrically disposed axial through openings.

8. The vibration isolator of claim 7, wherein the axial through opening of the first bushing has a shape corresponding to an exterior shape of the second bushing.

9. The vibration isolator of claim 1, wherein an inner surface of the axial through opening of the first bushing comprises a first circumferential groove, the first circumferential groove being configured to align with a second circumferential groove of the second bushing, wherein the first groove and the second groove combine to form a first retention track formed between the first and second bushings.

10. The vibration isolator of claim 9, further comprising a first retention member positioned within the first retention track, the first retention member being configured to retain the second bushing relative to the first bushing.

11. The vibration isolator of claim 9, wherein the open-ended sleeve further comprises a third circumferential groove extending around an inner surface of the sleeve that is configured to align with a fourth circumferential groove encircling an outer surface of the first bushing to form a second retention track.

12. The vibration isolator of claim 11, wherein a second retention member is positioned within the second retention track to retain the first bushing relative to the open-ended sleeve.

13. The vibration isolator of claim 1, wherein the axial through opening of the second bushing is configured to receive a fastener.

14. The vibration isolator of claim 1, further comprising a mounting sleeve having an interior configured to receive the vibration isolator.

15. The vibration isolator of claim 14, wherein the interior of the mounting sleeve includes an inner threaded surface and the housing of the vibration isolator includes an outer threaded surface configured for engagement.

16. The vibration isolator of claim 15, wherein the mounting sleeve comprises a flange having a slot extending through a portion of the flange perpendicular to a longitudinal axis of the mounting sleeve, the flange having a mounting hole parallel to the longitudinal axis and sized to receive a fastener to engage the slot in order to selectively adjust the height of the vibration isolator within the mounting sleeve.

17. The vibration isolator of claim 1, wherein the vibration isolator has a natural frequency between 30 to 55 Hz.

18. A vibration isolating monument mount, comprising:
a housing having a top surface and an opposing bottom surface;
an open-ended sleeve having a hollow interior and an extending flange, the flange having a top surface and a bottom surface, the bottom surface of the flange flush with a bottom surface of the sleeve;
a resilient core positioned between and secured to the bottom surface of the housing and the top surface of the flange of the sleeve, the resilient core conforming to a portion of an inner surface of the housing to form an upper surface;
a first bushing retained within the cylindrical sleeve such that the first bushing overlays a top surface of the resilient core; and
a second bushing retained within an axial through opening of the first bushing in which the axial through opening is eccentrically disposed relative to a center longitudinal axis of the monument mount.

19. The monument mount of claim 18, in which the first and second bushings are eccentrically mounted relative to one another.

20. A method of manufacturing a vibration isolator, the method comprising:
providing a housing having a top surface and an opposing bottom surface;
providing an open-ended sleeve having a hollow interior and an extending flange, the flange having a top surface and a bottom surface, at least a portion of the sleeve being disposed within the housing;
providing a resilient core configured to be bonded to the bottom surface of the housing and the top surface of the flange of the sleeve;
providing a first bushing configured to be disposed within the sleeve such that the first bushing overlays a top surface of the resilient core; and
providing a second bushing configured to be disposed within an axial through opening of the first bushing in which the axial through opening is eccentrically disposed relative to a center longitudinal axis of the isolator.

* * * * *